(12) United States Patent
Chenn

(10) Patent No.: US 8,024,083 B2
(45) Date of Patent: Sep. 20, 2011

(54) CELLPHONE BASED VEHICLE DIAGNOSTIC SYSTEM

(76) Inventor: Ieon C. Chenn, Laguna Hills, CA (US)

( * ) Notice: Subject to any disclaimer, the term of this patent is extended or adjusted under 35 U.S.C. 154(b) by 7 days.

(21) Appl. No.: 11/172,293

(22) Filed: Jun. 30, 2005

(65) Prior Publication Data

US 2007/0005201 A1    Jan. 4, 2007

(51) Int. Cl.
  *G01M 17/00*  (2006.01)
  *G06F 7/00*   (2006.01)
  *G06F 19/00*  (2006.01)

(52) U.S. Cl. .................. 701/29; 701/2; 701/24; 701/30; 701/31; 701/213

(58) Field of Classification Search .............. 701/2, 26, 701/29, 30, 31, 213; 455/412.2, 414.2, 456.1, 455/419, 423, 424
See application file for complete search history.

(56) References Cited

U.S. PATENT DOCUMENTS

| | | | |
|---|---|---|---|
| 2,960,654 A | 11/1960 | Nelson | |
| 3,646,438 A | 2/1972 | Staff | |
| 4,112,748 A | 9/1978 | Walley | |
| 4,176,315 A | 11/1979 | Sunnarborg | |
| 4,207,611 A | 6/1980 | Gordon | |
| 4,404,639 A | 9/1983 | McGuire et al. | |
| 4,684,896 A | 8/1987 | Weishaupt | |
| 4,689,573 A | 8/1987 | Hilmer | |
| 4,859,932 A * | 8/1989 | Whitley ........................ 324/72.5 | |
| 4,884,033 A | 11/1989 | McConchie, Sr. | |
| 5,003,478 A | 3/1991 | Kobayashi et al. | |
| 5,005,129 A | 4/1991 | Abe et al. | |
| 5,032,791 A | 7/1991 | Bates, Jr. | |
| 5,107,428 A | 4/1992 | Bethencourt et al. | |
| 5,157,708 A | 10/1992 | Garthwaite et al. | |
| 5,170,125 A | 12/1992 | Bates, Jr. | |
| 5,214,582 A | 5/1993 | Gray | |
| 5,247,245 A | 9/1993 | Nelson | |
| 5,278,508 A | 1/1994 | Bowman | |
| 5,285,163 A | 2/1994 | Liotta | |
| 5,359,290 A | 10/1994 | Cervas | |
| 5,394,093 A | 2/1995 | Cervas | |
| 5,400,018 A * | 3/1995 | Scholl et al. ................. 340/10.3 |
| 5,479,479 A * | 12/1995 | Braitberg et al. .......... 455/404.1 |
| 5,481,906 A | 1/1996 | Nagayoshi et al. | |
| 5,491,418 A | 2/1996 | Alfaro et al. | |
| 5,506,772 A | 4/1996 | Kubozono et al. | |
| 5,541,840 A | 7/1996 | Gurne et al. | |
| 5,635,841 A | 6/1997 | Taylor | |
| 5,657,233 A * | 8/1997 | Cherrington et al. ......... 705/400 |

(Continued)

OTHER PUBLICATIONS

Sunpro Sensor Testers Product Comparison, 1995, (4 pages).

(Continued)

*Primary Examiner* — Khoi Tran
*Assistant Examiner* — Jorge Peche
(74) *Attorney, Agent, or Firm* — Stetina Brunda Garred & Brucker

(57) ABSTRACT

A vehicular diagnostic communications system, and components thereof, are provided for an apparatus and technique for communicating vehicular diagnostic information over a cellphone network. The system includes a code reader having a vehicle diagnostic port connector for receiving vehicle diagnostic information from the vehicle diagnostic port. The code reader also has a local connectivity network circuit for communicating vehicle diagnostic information between the vehicle diagnostic port connector and a local connectivity circuit. A cellphone is arranged in communication with the local connectivity network for communicating vehicle diagnostic information between the code reader and a cellular telephone network.

41 Claims, 5 Drawing Sheets

U.S. PATENT DOCUMENTS

| | | | |
|---|---|---|---|
| 5,758,300 A * | 5/1998 | Abe | 455/424 |
| 5,916,286 A * | 6/1999 | Seashore et al. | 701/29 |
| 5,935,180 A * | 8/1999 | Fieramosca et al. | 701/29 |
| 6,169,943 B1 * | 1/2001 | Simon et al. | 701/29 |
| 6,225,898 B1 | 5/2001 | Kamiya et al. | |
| 6,263,265 B1 | 7/2001 | Fera | |
| 6,263,268 B1 * | 7/2001 | Nathanson | 701/29 |
| 6,263,322 B1 | 7/2001 | Kirkvold et al. | |
| 6,295,492 B1 | 9/2001 | Lang et al. | |
| 6,330,499 B1 | 12/2001 | Chou et al. | |
| 6,362,730 B2 * | 3/2002 | Razavi et al. | 340/438 |
| 6,389,337 B1 * | 5/2002 | Kolls | 701/29 |
| 6,535,802 B1 | 3/2003 | Kramer | |
| 6,680,675 B1 * | 1/2004 | Suzuki | 340/988 |
| 6,687,584 B2 | 2/2004 | Andreasen | |
| 6,836,708 B2 * | 12/2004 | Tripathi | 701/29 |
| 6,947,816 B2 * | 9/2005 | Chen | 701/33 |
| 7,064,681 B2 * | 6/2006 | Horstemeyer | 340/994 |
| 7,164,760 B2 * | 1/2007 | Krause | 379/142.06 |
| 7,209,813 B2 * | 4/2007 | Namaky | 701/29 |
| 7,312,697 B2 * | 12/2007 | Veliu et al. | 340/438 |
| 7,463,959 B2 * | 12/2008 | Namaky | 701/29 |
| RE40,799 E * | 6/2009 | Chen | 701/33 |
| 7,751,953 B2 * | 7/2010 | Namaky | 701/29 |
| 2001/0053983 A1 | 12/2001 | Reichwein et al. | |
| 2002/0156692 A1 | 10/2002 | Squeglia et al. | |
| 2002/0183904 A1 * | 12/2002 | Sakurai et al. | 701/33 |
| 2002/0193925 A1 * | 12/2002 | Funkhouser et al. | 701/33 |
| 2003/0060953 A1 * | 3/2003 | Chen | 701/33 |
| 2003/0208309 A1 * | 11/2003 | Triphathi | 701/29 |
| 2004/0203467 A1 * | 10/2004 | Liu et al. | 455/67.14 |
| 2004/0227523 A1 * | 11/2004 | Namaky | 324/537 |
| 2005/0102074 A1 * | 5/2005 | Kolls | 701/29 |
| 2005/0119827 A1 * | 6/2005 | Willer et al. | 701/213 |
| 2006/0238320 A1 * | 10/2006 | Veliu et al. | 340/438 |
| 2007/0198148 A1 * | 8/2007 | Namaky | 701/29 |
| 2007/0296559 A1 * | 12/2007 | Fehr | 340/426.2 |
| 2009/0076678 A1 * | 3/2009 | Namaky | 701/33 |

OTHER PUBLICATIONS

Sunpro Sensor Tester Plus, undated (1 page).
OTC's Latest Innovations, 1989 (6 pages).
OTC Diagnostic Testers and Tools for the Professional, undated (20 pages).
OTC System 2000 Diagnostic Testers and Tools, undated (24 pages).
EPA Performing Onboard Diagnostic System Checks as Part of a Vehicle Inspection and Maintenance Program, Jun. 2001 (25 pages).
Equus Products, Inc. Catalog, 1998 (32 pages).
Equus Products, Inc. Catalog, Automotive Testers, Gauge and Tachometers and Cruise Control, 1995 (28 pages).
Sunpro Catalog by Actron, Nov. 1996 (20 pages).
Innova Electronics Corporation Brochure & Owner's Manual, 3100 OBD II Code Reader, 2001.
Equus Products, Inc. Manual-ECM Code Reader, Model 3007, 1993 (18 pages).
Equus Products, Inc. Manual-ECM Code Reader, Model 3008, 1993 (5 pages).
Innova Electronics Corporation Brochure & Owner's Manual, 3173 Import Code Reader, 2003.

* cited by examiner

CELLPHONE BASED VEHICLE DIAGNOSTIC SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to automotive communication systems and, more particularly, to communication systems for interfacing automotive diagnostic systems and remote diagnostic, repair and emergency services.

Vehicle diagnostic systems have evolved in many ways to provide detailed information regarding the status of multiple vehicle systems. Such diagnostic systems may also be queried to output different information, as well as be programmed to modify vehicle operational parameters. As the sophistication of vehicle diagnostic systems grows, however, the requirements for supporting equipment can become more specialized, and the operational complexity of the supporting equipment may be beyond the level of ordinary consumers.

The increasing sophistication of vehicle diagnostic systems has also given rise to a variety of communication systems for interfacing the vehicle diagnostic system to wireless networks, for routing vehicle owners to service providers, the internet and elsewhere. Business models for various automatic systems have emerged, based on different commercial approaches for interfacing communication networks to vehicle voice and data systems.

One such contemporary business model is exemplified by the OnStar™ system, operated by General Motors Corporation. The system typically includes a wireless appliance installed in the vehicle, wired to the vehicle diagnostic system. The wireless appliance may include, or be wired to a global position satellite (GPS) system, for generating information respecting the location of the vehicle. OnStar™ system also allows remote operation of certain vehicle systems, e.g. unlocking the doors. The OnStar™ service is typically provided on a subscription basis, with the first year being free of charge with the purchase of qualifying vehicles, i.e. typically higher priced vehicles.

Another wireless vehicle system of note is the LoJack™ system for protecting vehicle theft conditions, and monitoring the location of the vehicle in the event that it is stolen or lost. Like the OnStar™ system, the LoJack™ system utilizes a wireless appliance that incorporates a GPS system, communicates to a dedicated receiver, and charges a subscription fee to maintain and support the data link.

While dedicated communication links such as those utilized in the OnStar™ system and the LoJack™ system, can provide useful diagnostic services and security in relation to a variety of circumstances, such systems suffer from a variety of practical and economic factors that tend to limit their use and customer base.

A common shortcoming of such contemporary systems is that they typically require dedicated hardware, e.g. a wireless appliance mounted to a vehicle, and electrically connected to the vehicle computer. Such hardware is typically installed by a trained installer or by original car manufacturer. Moreover, the hardware relies upon a dedicated wireless communication link to a specific service provider. Consequently, the user may feel captive to a particular diagnostic subscription service. Such systems may be viewed as expensive, of limited functionality, and tend to be standard equipment only in higher priced vehicles.

Given the rapid evolution of cellphones, and the proliferation of multiservice cellular telephone networks, the need for accessing a diagnostic system communications link may be better served by cellphones, and which allow a broader choice of contacts. In relation to conventional prior art systems, it would be desirable to provide a diagnostic communication system that does not require mounting to a vehicle chassis, or need installation by a trained installer. It is desirable to provide a diagnostic communication system that does not require a dedicated communications link, but rather allows a user to connect to a variety of generally available contacts on the cellular network, public telephone network and the internet, without the need for participation in a subscription communication service. It is further desirable to provide a diagnostic communication system that is installable, removable, hand transportable and plug connectable to different vehicles, without the need for trained assistance or service registration. It is desirable to provide a hand transportable diagnostic communication system, that allows for internal storage of vehicle diagnostic information, and transfer of the information, wirelessly and/or manually, to a general purpose computer. Such manual data transport would allow for storage and communication of data to a remote service provider, even when communication via cellular telephone network or local connectivity circuit is unavailable. As described below, the present invention, in different combination embodiments, addresses these and other improvements to contemporary vehicle diagnostic communication systems, and business methods related thereto.

BRIEF SUMMARY

A vehicular diagnostic communications system, and components thereof, are provided for an apparatus and technique for communicating vehicular diagnostic information over a cellphone network. The system includes a code reader having a vehicle diagnostic port connector for receiving vehicle diagnostic information from the vehicle diagnostic port. The code reader also has a local connectivity network circuit for communicating vehicle diagnostic information between the code reader and a local connectivity network. A cellphone is arranged in communication with the local connectivity network for communicating vehicle diagnostic information between the code reader and a cellular telephone network.

The cellphone functionality in the present invention may be alternately implemented using a personal data assistant or similar devices for interfacing a local connectivity network and a cellular network.

The local connectivity network may be implemented in a variety of forms, such as the 802.11 format, Bluetooth™, etc. Alternatively, the local connectivity network may be implemented as an infrared communications network, operating in accordance with generally utilized communications protocols for such systems. It also allows for voice communication in conjunction with data transfer and evaluation.

A variety of functions may be implemented on the cellphone and/or code reader to initiate a diagnostic communications link, or to indicate receipt of an interrogation signal, representing initiation of diagnostic activity or receipt of diagnostic data.

The cellphone and/or code reader may also be equipped with a GPS locator circuit to provide location information that may be communicated within the communication link to facilitate various functions that may be implemented within the scope of the present invention, e.g. location of nearest automotive parts store/service provider/etc.

A code reader construction in accordance with the present invention may be implemented utilizing conventional code reader, modified with an adapter that links the code reader to a local connectivity network. That implementation permits considerable efficiency, and readily allows conventional use of a code reader where access to a local connectivity circuit is not available. Where the code reader is adapted pursuant to the present invention, or where provided with a local connectivity circuit, the invention provides a computer data port connector that allows for direct connection of the code reader to a personal computer data port, such as a USB port. In some implementations the code reader may be engagable to and supportable by connection to the vehicle diagnostic port and/or the computer data port.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
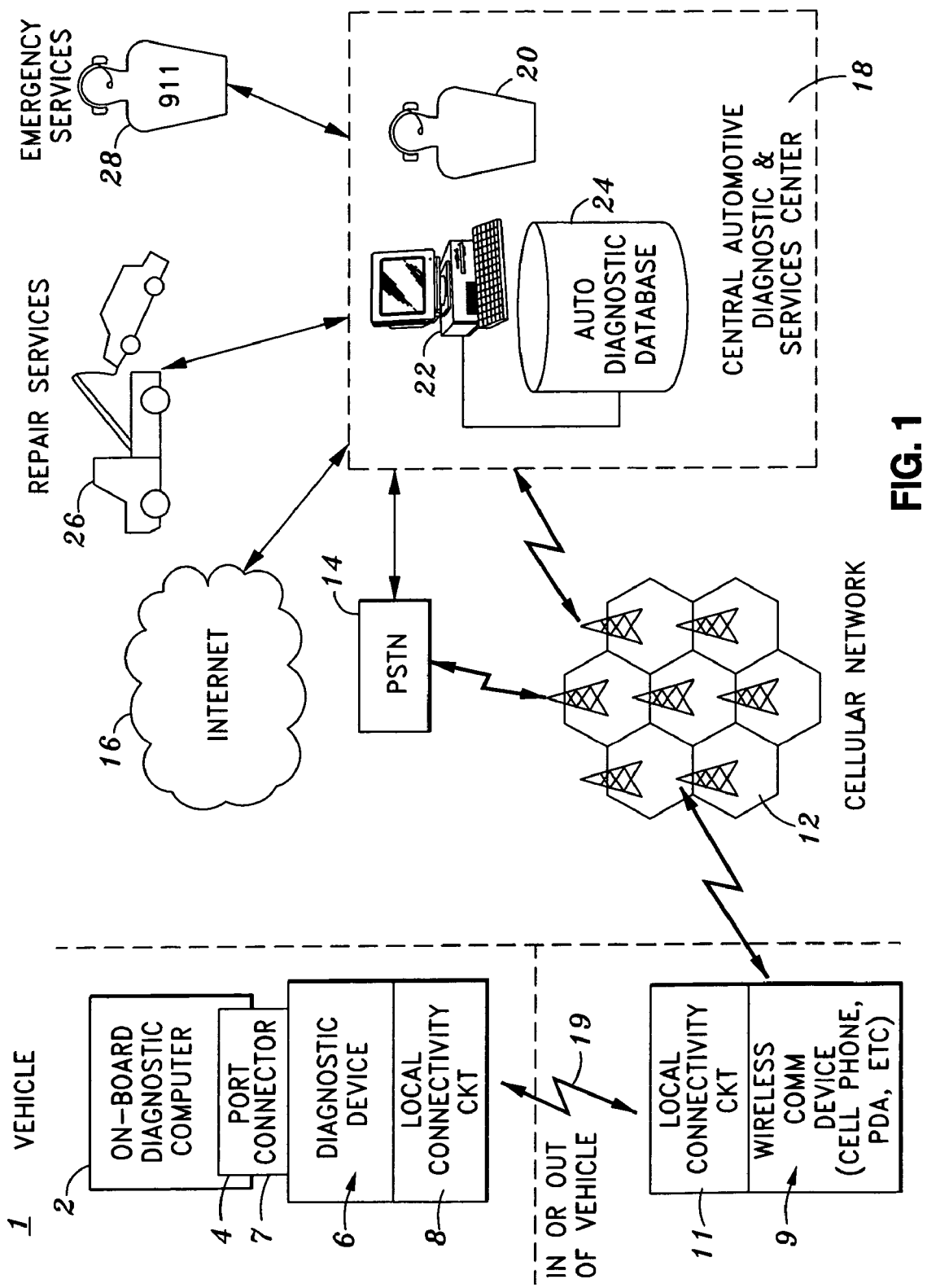
FIG. 1 is a block diagram showing basic functional feature of one embodiment of the invention.

The above description is given by way of example, and not limitation. Given the above disclosure, one skilled in the art could devise variations that are also within the scope and spirit of the invention disclosed herein, including various ways of linking a vehicle diagnostic port to a local connectivity circuit to access a cellular telephone network, and beyond. Further, the various features of the embodiments disclosed herein can be used alone, or in varying combinations with each other and are not intended to be limited to the specific combination described herein. Thus, the scope of the claims is not to be limited by the illustrated embodiments or interpretation of those embodiments.

As described more fully below, the present invention utilizes the evolving capacity of cellular telephones to support voice and data information, to avoid the need for installing dedicated wireless devices in a car to communicate between the diagnostic system and a cellular network, or other dedicated radio frequency systems. Such contemporary cellphones incorporate a user visual interface, a series of input keys, an internal processor, internal storage, and communications links adapted for bidirectional communication of voice, data and control signals, sufficient to access and communicate diagnostic information and related control signals.

In one embodiment of the invention diagnostic information and/or control signals are communicated between the cellphone and the vehicle on-board computer via a code reader or scan tool (collectively referred to as a "code reader"), modified to incorporate a local connectivity circuit, and a cellphone or personal data assistant also incorporating a local connectivity circuit which may be implemented as a Bluetooth™, Wi-Fi or infrared connectivity circuit. As such, the code reader may operate to perform conventional functions of accessing and downloading vehicle diagnostic information, which may then be communicated to the cellular network via the scan tool/cellphone local connectivity network.

Where the code reader is not engaged in communication with a local connectivity network (e.g. not located proximate a Bluetooth™ enabled cellphone), the code reader can store the diagnostic information for review or be used to manually transport data from the vehicle to be uploaded from to a remote personal computer, (e.g. by USB connector or personal computer supported local connectivity network), for communication with a remote service provider. The code reader local connectivity circuit may, therefore, be in communication with a personal computer local connectivity circuit. As such, diagnostic information may alternately be communicated from the code reader to a personal computer, for further communication to remote service providers, without use of the cellular network.

In some embodiments the code reader may communicate with other devices, such as a personal data assistant or Blackberry™, (collectively a "personal data assistant") adapted for communication with a local connectivity circuit and/or the cellular telephone network. In further embodiments, the code reader may itself incorporate a cellular network connectivity circuit, for communicating directly between the code reader and the cellular telephone network.

In further embodiments the cellphone and/or code reader may incorporate GPS circuitry to provide location information that may be communicated to a remote service provider along with diagnostic information, via the cellular telephone network and/or manual transport and uploading to a personal computer.

In another implementation, a code reader adapter is provided for interfacing a conventional code reader to a local connectivity network for communicating information accessed by the code reader to a cellphone or personal computer.

Turning now to the drawings, FIG. 1 illustrates basic structure and function of one implementation of the present invention. In the implementation shown therein, vehicle 1 incorporates an onboard diagnostic computer 2, having a vehicle diagnostic port 4. Diagnostic device 6, such as a code reader, has a diagnostic port connector 17 plug engagable to diagnostic port 4, to access diagnostic information from the vehicle onboard diagnostic computer 2. In other embodiments, the connecting cable 19 is provided to connect the diagnostic device 6 to the vehicle onboard computer 2.

The diagnostic device 6 may be provided with a local connectivity circuit 8, to facilitate communication of diagnostic information and control signals between the diagnostic device 6 and a local connectivity network 19, for communication between the diagnostic device 6 and wireless communication device 9. The wireless communication device 9 may be implemented as a cellphone, PDA, Blackberry or other similar devices. The wireless communication device 9 also incorporates a local connectivity circuit 9, which allows local communication between the diagnostic device 6 and the wireless communication device 9. As indicated above, the local connectivity circuit may be implemented using Bluetooth™, Wi-Fi, infrared or other protocols commonly used for such network.

The wireless communication device 9 is, in turn, in communication with a cellular telephone network 12. The cellular telephone network 12 is, in turn, in communication with Public Switched Telephone Network (PSTN) 14 and/or the Central Automotive Diagnostic and Services Center 18.

The central automotive diagnostic and services center 18 includes a computer terminal 22 and interconnected automotive diagnostic database 24. The operator or human interface 20, may thereby receive information from the wireless communication device 10, such as diagnostic trouble codes, which can be correlated into the corresponding diagnostic condition, using automotive diagnostic database 24. The operator or human interface 20 may take steps appropriate to the diagnostic condition, by communicating with repair services 26, emergency services 28, or to other parts or services providers, or by communicating with the user, via the cellular network.

Figure 2:
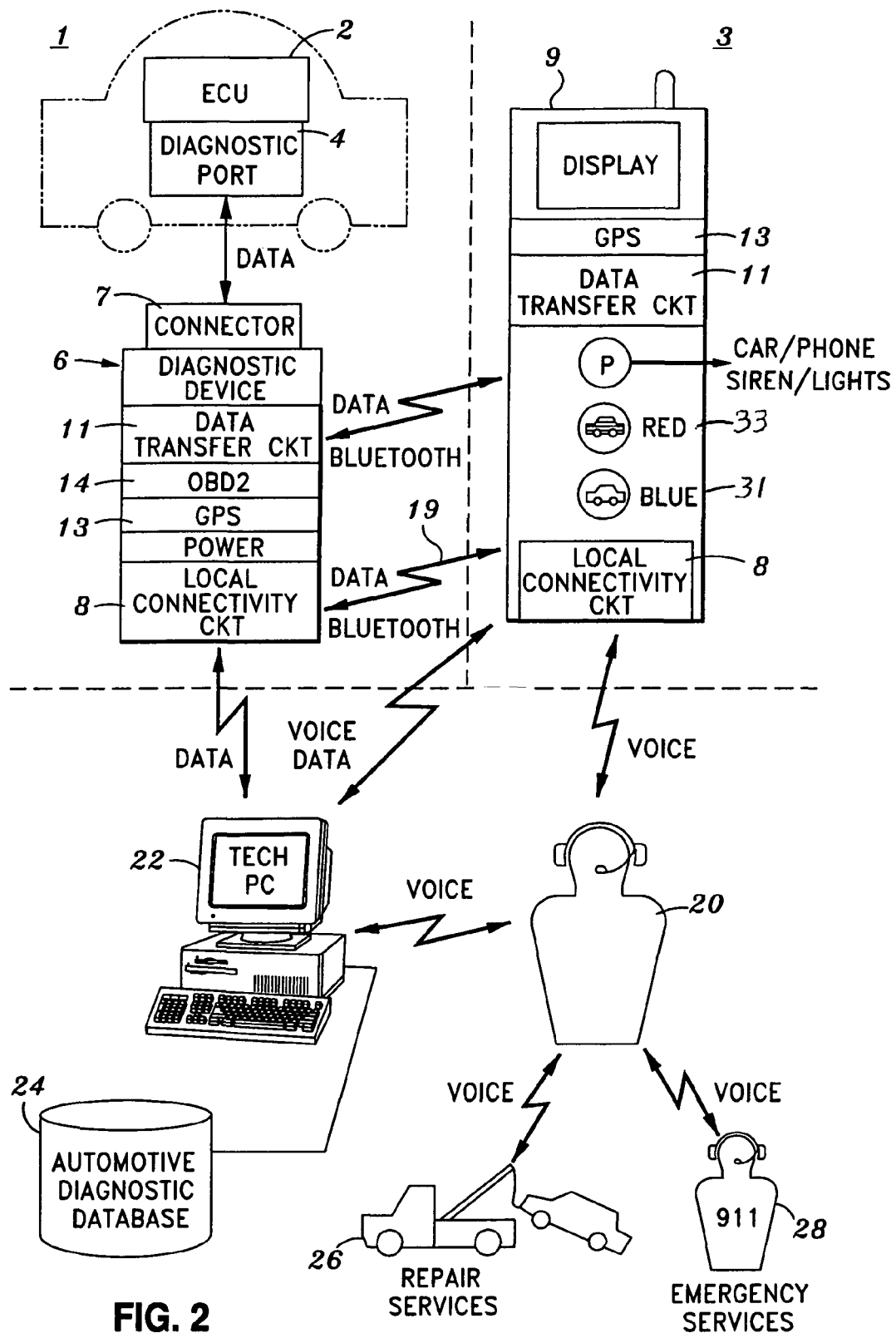
FIG. 2 is a basic block diagram further illustrating functions of additional implementations of the invention.
Figure 3:
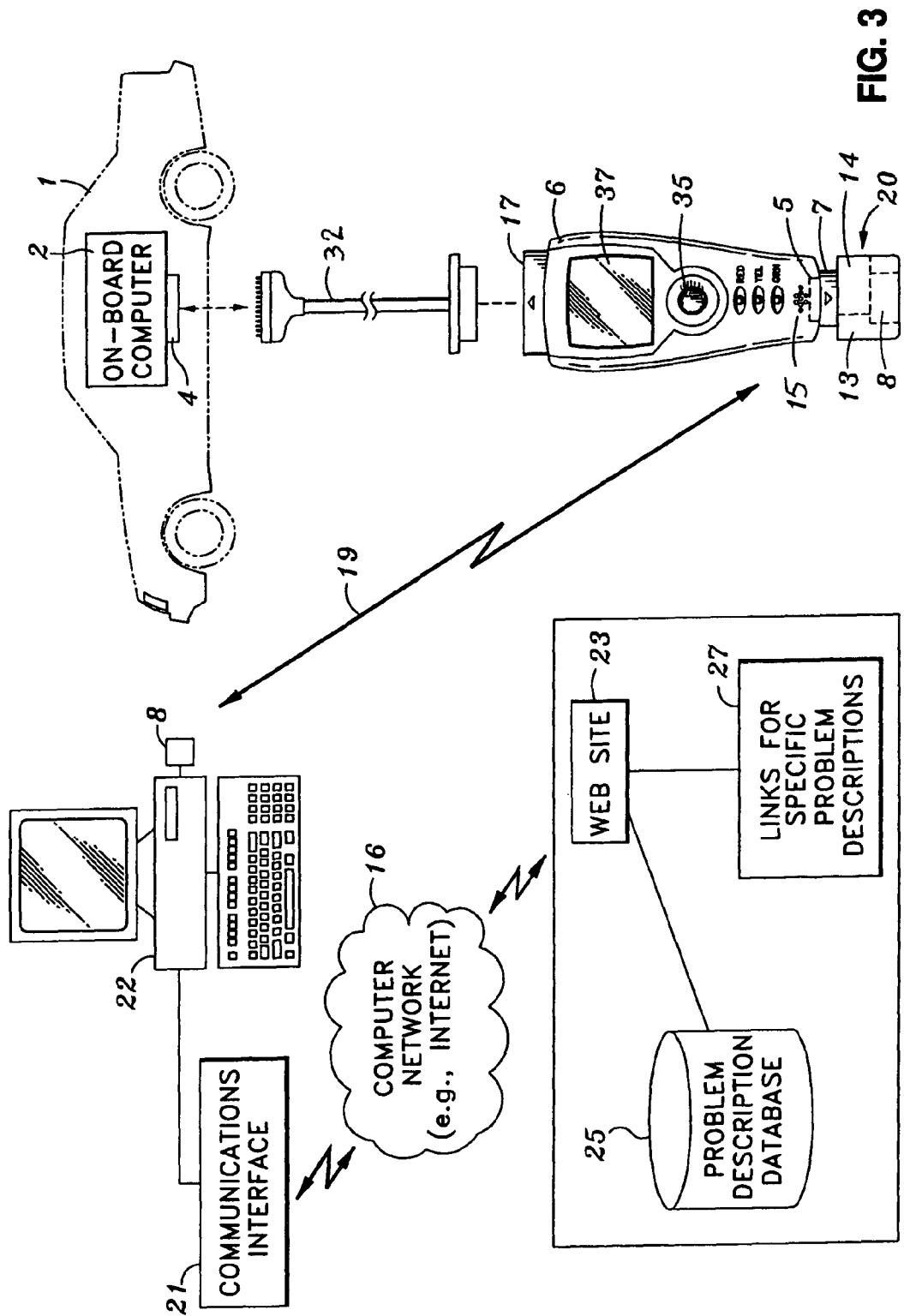
FIG. 3 is a block diagram illustrating additional embodiments of the invention.

FIG. 2 illustrates additional functionality of the present invention in connection with the illustrated embodiment. As shown therein, vehicle 1 again incorporates an onboard diagnostic computer 2 and diagnostic port 4. The diagnostic device 6, sometimes referred to as a code reader or scan tool, is in direct electrical connection with the diagnostic port 4, and may be supported thereby. In alternate embodiments the tool 6 may be connected to port 4 via cable 32, as shown at FIG. 3.

When the present invention is implemented using a conventional scan tool or code reader, an adapter is provided to provide connectivity to communicate with the local connectivity network. As shown in FIG. 3, adapter 20 is engaged to device 6, such as by connector 7 engaged to device port 5. Port 5 may be implemented as a USB connector port plug engagable to the adapter 20, or to a USB port of a personal computer.

Adapter 20 includes a local connectivity circuit 8, for data communication with the wireless communication device 9 (as shown in FIGS. 1, 2) and/or the computer terminal 22. The adapter 20 may further include a GPS circuit 13 and an OBD II protocol circuit 14.

Most commonly the wireless device 9 may be implemented as a generally conventional cellphone, with functionality for communicating with the diagnostic device 6 or adapter 20, where the adapter is implemented separate from the diagnostic device 6.

Wireless device 9 may incorporate a local connectivity circuit 11, for communicating with the diagnostic device local connectivity circuit 8. The cellphone 9 therefore can communicate data, such as diagnostic information and control signals between the diagnostic device 6 and the cellular telephone network. As such, the onboard computer 2 may be queried, or operating parameters adjusted, as appropriate to access diagnostic information, or change operating conditions within the vehicle.

In one embodiment of the invention as shown in FIG. 2, the cellphone 9, is provided with dedicated function lights, and associated function circuitry, to facilitate communication of diagnostic information. Blue indicator 31 is operative to provide a data ready signal to indicate receipt of diagnostic trouble codes from the diagnostic device local connectivity circuit 8. The blue indicator 31 may also function to initiate a communications link, using the cellular communication network, to communicate with the Central Automotive Diagnostic and Services Center 18 (FIG. 1) or such other telephone number as may be desired by the user.

In one embodiment of the invention pressing the blue indicator 3 may automatically link the cellphone to a preset telephone number. In another embodiment of the invention, depression of the blue button will generate options on the cellphone display, which may be selected by use of the cellphone keyboard. One such option may include manual entry of desired telephone number on the keypad.

Illumination of the red indicator 33 may serve to indicate presence of one or more predetermined trouble codes, or other diagnostic information indicative of a more immediate need for attention. Again, in different embodiments of the invention the red indicator 33 may function as an input button, which may be depressed to initiate a communications link with diagnostic device, e.g. generate an interrogation signal for communication to the diagnostic device 6.

As shown in FIG. 2, the cellphone 9 may further include a GPS circuit 13, as is included in some contemporary cellphones. The GPS information may be encoded and communicated from the cellphone 9 to a remote service provider. Alternatively, as described above, GPS circuitry 13 may be included within diagnostic device 6.

The diagnostic device 6 may be implemented in a variety of forms, including a variety of functions and displays. In the embodiment shown at FIG. 3, the diagnostic device 6 incorporates a connect button 35, operative to electrically connect the diagnostic device 6 to the vehicle onboard computer in response to pressing connect button 35. As such, the diagnostic device may be in operative connection with the onboard computer without the need for user to navigate a user visual interface.

Diagnostic device 6 may also be provided with a display 37 to allow the user to read trouble codes, trouble code descriptors and/or other text or graphic information as may be provided from the vehicle onboard computer, or processed by the diagnostic device 6.

Diagnostic device 6 may further include a plurality of different colored indicators, to indicate the presence of the receipt of diagnostic trouble codes from the onboard computer (red), the absence of trouble codes received from the onboard computer (green), or an incomplete or interrupted test (yellow). The device 6 may further provided with an audio output 15, which may provide an audio signal responsive to functions of the diagnostic device 6.

The diagnostic device 6 may also be provided with an output connector 5, which may be a USB output port that is engagable to connector 7 of local connectivity adapter 20. Diagnostic information from the onboard computer 2 may therefore be communicated to the diagnostic device 6, and thereafter communicated to a local connectivity circuit for communication to a wireless device 8 or computer terminal 22. Alternatively, the diagnostic device 6 connector port 5 may be directly connected to computer terminal 22, e.g. though a USB port, to allow downloading of diagnostic information received from the vehicle onboard computer 2 and stored in the diagnostic device 6. The computer terminal 22 may in turn be connected to the computer network 16, via communications interface 21. The computer network 16 allows the computer terminal 22 to be connected to website 23 which may be linked to a problem description database 25 and/or links for specific problem descriptions 27.

In practice, the diagnostic device 6 may thereby allow either real time or delayed communication of diagnostic information from the vehicle onboard computer 2 to one or more remote locations, wherein vehicle diagnostic information may be analyzed and corrective actions identified. Information respecting parts and services useful for such corrective actions may be communicated to the user and displayed on the diagnostic display 37 or cellphone display. Selection of various functions may be implemented using input buttons on the diagnostic device 6 or cellphone, e.g. keypad, as may be appropriate for different diagnostic conditions.

Figure 4:
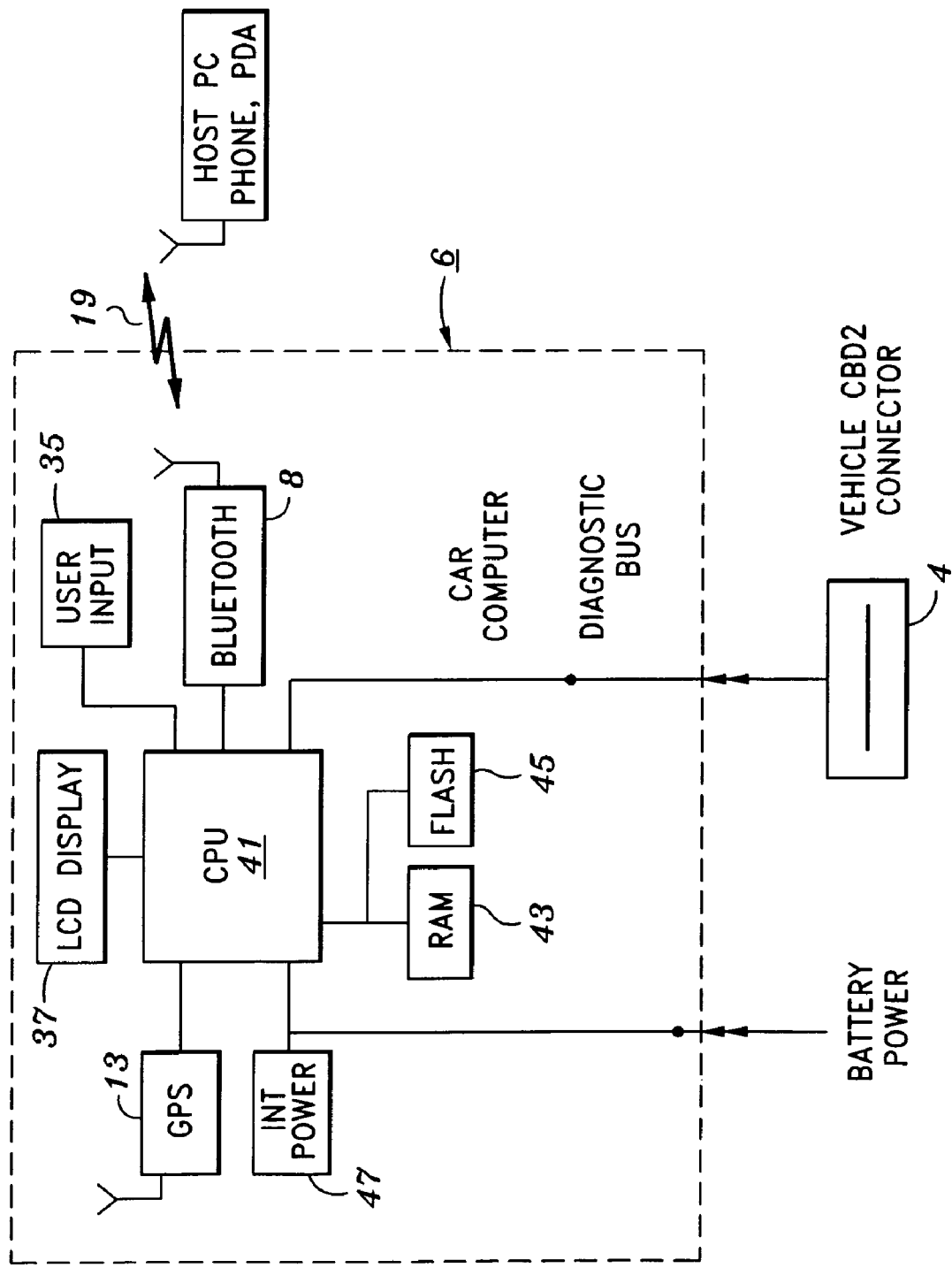
FIG. 4 is a block diagram of a scan tool constructed in accordance with one implementation of the invention.

FIG. 4 illustrates a basic functional diagram of representative of the operation of device 6, in one implementation. As shown therein, the device 6 is adapted for bidirectional communication with a vehicle diagnostic port, a local connectivity circuit, and a USB connector (or the like) for a host PC. As shown therein, the device 6 may include a GPS circuit 13, user inputs 35, (such as keypads or connect buttons) and one or more LCD displays 37. The device 6 may include a central processing unit 41 (CPU) operatively connected to a random access memory 43 (RAM) and a flash memory 45, which may store information such as descriptors associated with particular diagnostic trouble codes received from a vehicle onboard computer. Information stored in the flash memory 45 may be modified in response to data or control signals received through the local connectivity circuit 19 or a USB connector. In one implementation data or control signals from the local connectivity circuit or the USB connector may be communicated to the vehicle onboard computer, in order to perform functions such as obtaining additional vehicle data or modifying settings in the vehicle onboard computer in response to sensed diagnostic information. The device 6 may operate using internal power source 47, or be connected to an external power source.

Figure 5:
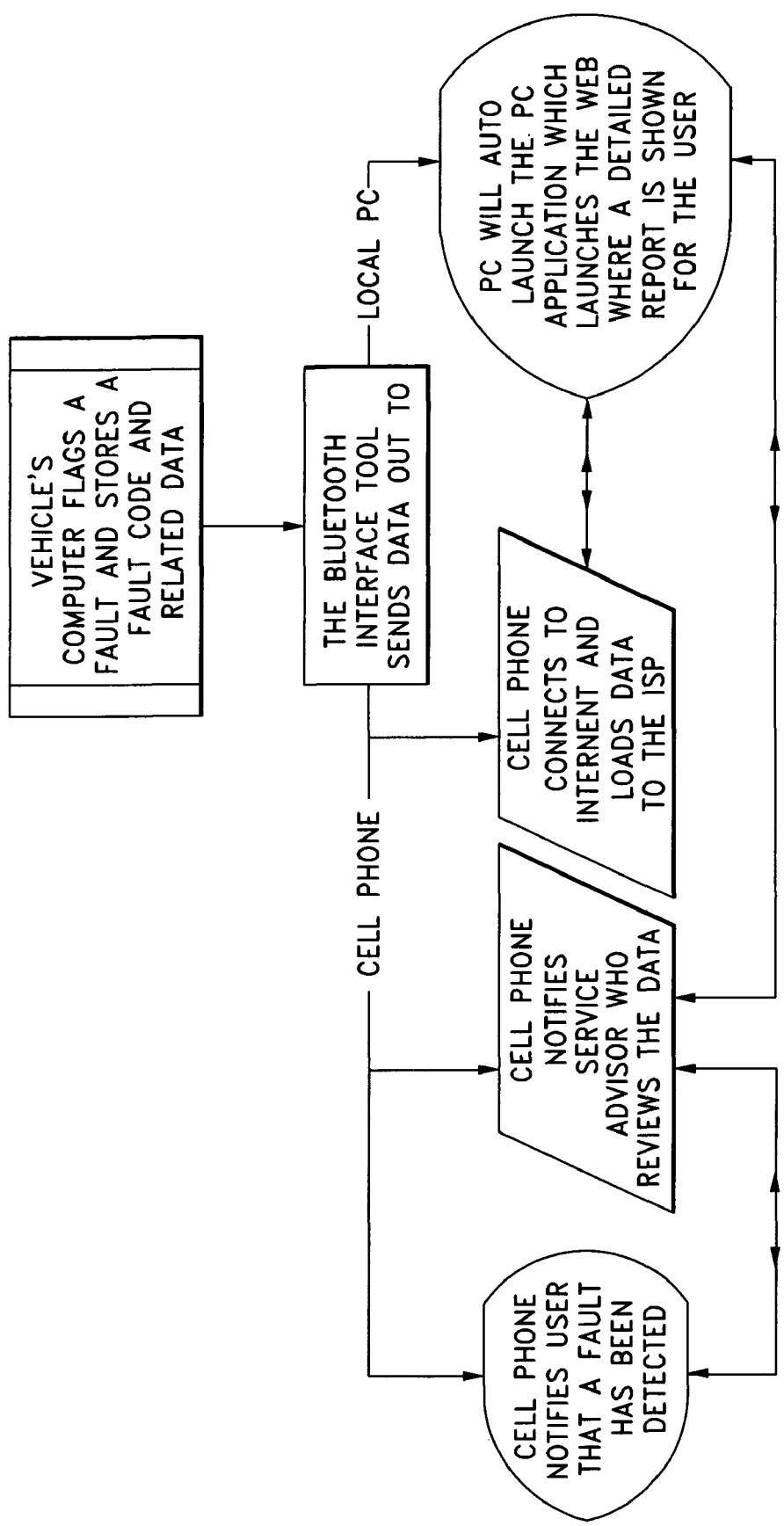
FIG. 5 is a flow chart illustrating the sequence of functions in accordance with one implementation of the invention.

FIG. 5 is a flow chart representing certain operations that may be effected in accordance with one implementation of the present invention. As the process shown therein is initiated when the vehicle flags a fault, and stores a fault code and related vehicle diagnostic data. That information is communicated to a diagnostic device, having a local connectivity circuit formed therein, or formed in an adapter connected to the scan tool. As indicated above, the scan tool may generate visual or audible signals indicating the receipt of the fault codes, and display associated descriptors. The local connectivity circuit can communicate the fault code and related data to nearby equipment having compatible local connectivity circuits, such as Bluetooth equipped cellphone or local computer terminal. Where the fault codes and related data are received by the cellphone, the cellphone may provide the user with information that a fault has been detected, such as by illuminating a dedicated indicator on the cellphone, or by generating an audible signal, or by providing text data on the cellphone display. The cellphone may further proceed to notify a service adviser that fault codes and related data have been received. Such notification may proceed autonomously by programming within the cellphone, or may require the cellphone user to initiate a communication with the service advisor, either by depressing a dedicated button, navigating a cellphone user visual interface, or by entering a desired telephone number.

The cellphone may communicate data, over the cellular telephone network, to a service advisor either by direct cellphone link, by connection to a landline via public switched telephone network, or by connection to internet portal, whereby data is communicated via the internet to an internet service provider.

Where the diagnostic device local connectivity circuit is in communication with a local personal computer, the personal computer may implement connectivity with internet service providers, landline telephones or other systems to provide analysis of the fault codes and related data, as well as any data control signals necessary to obtain additional information from the vehicle onboard computer, or to adjust the operation thereof. Voice communication may also be implemented between the service provider receiving the fault codes and related data, and the user's cellphone, to provide additional information, such as the location of a nearby service facility, emergency service communications, towing services, etc.

What is claimed is:

1. A wireless vehicular diagnostic communication system for wireless communication of vehicle diagnostic information from a vehicle over a cellular telephone network, the system comprising:
    a hand transportable code reader having a vehicle diagnostic port connector connectable to a vehicle diagnostic port for receiving the vehicle diagnostic information from the vehicle diagnostic port;
    the code reader also having a local connectivity circuit for communicating the vehicle diagnostic information between the code reader and a wireless local connectivity network; and
    a cellphone in wireless communication with the wireless local connectivity network for communicating the vehicle diagnostic information wirelessly between the code reader and the cellular telephone network via a first wireless communication pathway from the code reader to the cellphone in combination with a second wireless communication pathway from the cellphone to the cellular telephone network;
    wherein said cellphone comprises a first indicator configured to provide a data-ready signal to indicate receipt of diagnostic trouble codes from said local connectivity circuit of said hand portable code reader, and a second indicator configured to indicate the presence of one or more pre-determined trouble codes, or other diagnostic information, indicative of a more immediate need for attention.

2. The system as recited in claim 1 wherein the cellphone enables communication of voice and data signals between the cellphone and the cellular telephone network.

3. The system as recited in claim 1 wherein the local connectivity network is a radio frequency communication network.

4. The system as recited in claim 1 wherein the local connectivity network is an infrared communication network.

5. The system as recited in claim 1 wherein the cellphone is operative to communicate the vehicle diagnostic information to any of a plurality of contacts, in response to phone number selection by a user.

6. The system as recited in claim 1 wherein the cellphone comprises a cellphone GPS locator circuit for determining the location of the cellphone.

7. The system as recited in claim 1 wherein the code reader comprises a code reader GPS locater circuit, for determining the location of the code reader and the vehicle.

8. The system as recited in claim 1 wherein the cellphone comprises a first manually activated data transfer circuit, for enabling a communications link between the code reader and the cellphone.

9. The system as recited in claim 1 wherein the code reader comprises a second manually activated data transfer circuit, for enabling a communication link between the code reader and the cellphone.

10. The system as recited in claim 1 wherein the code reader comprises an autonomous data transfer circuit for communicating the vehicle diagnostic information between the code reader and the cellphone, in response to receipt of the vehicle diagnostic information at the code reader diagnostic port connector.

11. The system as recited in claim 1 wherein the cellphone comprises an autonomous data transfer circuit for communicating the vehicle diagnostic information between the code reader and the cellphone in response to receipt of an interrogation signal from the cellphone.

12. The system as recited in claim 1 wherein the code reader is powered by connection to a vehicle electrical system thru the vehicle diagnostic port.

13. The system as recited in claim 1 wherein the code reader is powered by a self contained battery.

14. The system as recited in claim 1 wherein the code reader includes a data ready indicator circuit, for generating a data ready signal in response to receipt of the vehicle diagnostic information at the vehicle diagnostic port connector of the code reader.

15. The system as recited in claim 1 wherein the cellphone is in communication with the World Wide Web.

16. The system as recited in claim 1 wherein the cellphone is in communication with a public telephone network.

17. The system as recited in claim 1 wherein the vehicle diagnostic port of the code reader is plug engagable to the vehicle diagnostic port.

18. The system as recited in claim 1 wherein the code reader further comprises a memory circuit for storing the vehicle diagnostic information.

19. The system as recited in claim 18 wherein the code reader further comprises a computer data port connector, for communicating the vehicle diagnostic information between the code reader and a computer data port.

20. The system as recited in claim 17 wherein the computer data port connector is plug engagable to a computer data port.

21. The system as recited in claim 20 wherein the code reader computer data port connector includes a USB connector.

22. The system as recited in claim 1 wherein the cellphone comprises a data ready indicator circuit for generating a data ready signal in response to receipt of the vehicle diagnostic information from the code reader.

23. The system as recited in claim 1 wherein the code reader communicates control signals between the vehicle diagnostic port and the local connectivity network.

24. The system as recited in claim 7 wherein the code reader communicates a GPS locater signal to the local connectivity network.

25. The system as recited in claim 1 wherein the code reader supports bi-directional communication between the vehicle diagnostic port and the local connectivity network.

26. The system as recited in claim 25 wherein the cellphone supports bi-directional communication between the cellular network and the local connectivity network.

27. The system as recited in claim 1 wherein the vehicle diagnostic information comprises diagnostic trouble codes.

28. The system as recited in claim 1, wherein the cellular telephone network is configured to communicate a short range signal between the cell phone and the code reader and a longer range signal between the cell phone and the cellular network.

29. The system as recited in claim 1, wherein the code reader is configured to communicate a first signal between the code reader and the wireless connectivity network, the first signal including information representative of the vehicle diagnostic information.

30. The system as recited in claim 29, wherein the cellphone is configured to receive the first signal from the local connectivity network and transmit a second signal to the cellular network, the first and second signals including information representative of the vehicle diagnostic information.

31. The system as recited in claim 1, wherein the code reader is configured to be operable to receive the vehicle diagnostic information independent of the cellphone.

32. A wireless vehicular diagnostic communication system for wireless communication of vehicle diagnostic information from a vehicle over a cellular telephone network, the system comprising:
a hand transportable code reader having a vehicle diagnostic port connector connectable to a vehicle diagnostic port for receiving the vehicle diagnostic information from the vehicle diagnostic port;
the code reader further comprising a local connectivity circuit for communicating the vehicle diagnostic information wirelessly between the code reader and a wireless local connectivity network; and
a personal data assistant in wireless communication with the wireless local connectivity network and the cellular telephone network, for communicating the vehicle diagnostic information wirelessly between the code reader and the cellular telephone network via a first wireless communication pathway from the code reader to the personal data assistant, in combination with a second wireless communication pathway from the cellphone to the cellular telephone network;
wherein the personal data assistant comprises a first indicator configured to provide a data-ready signal to indicate receipt of diagnostic trouble codes from said local connectivity circuit of said hand portable code reader, and a second indicator configured to indicate the presence of one or more pre-determined trouble codes, or other diagnostic information, indicative of a more immediate need for attention.

33. The system as recited in claim 32 wherein the vehicle diagnostic information comprises diagnostic trouble codes.

34. A wireless vehicular diagnostic communication system comprising:
a hand transportable code reader engagable to a vehicle diagnostic port, the code reader having a vehicle diagnostic port connector for receiving vehicle diagnostic information from the vehicle diagnostic port and a data port for outputting the vehicle diagnostic information received from the vehicle diagnostic port;
a code reader communications adapter engagable to the code reader data port and defining a wireless communication interface between the code reader and a wireless local connectivity network; and
a cellphone in communication with the wireless local connectivity network and with a cellular telephone network for communicating the vehicle diagnostic information wirelessly between the code reader and the cellular telephone network via a first communication pathway from the hand transportable code reader to the cellphone and a second communication pathway from the cellphone to the cellular telephone network;
wherein the cellphone comprises a first indicator configured to provide a data-ready signal to indicate receipt of diagnostic trouble codes from said local connectivity circuit of said hand portable code reader, and a second indicator configured to indicate the presence of one or more pre-determined trouble codes, or other diagnostic information, indicative of a more immediate need for attention.

35. The system as recited in claim 34 wherein the local connectivity network is a radio frequency network.

36. The system as recited in claim 34 wherein the local connectivity network is an infrared connectivity network.

37. The system as recited in claim 34 wherein the vehicle diagnostic information comprises diagnostic trouble codes.

38. A method of communicating vehicle diagnostic information between a vehicle diagnostic port and a remote service provider, the method comprising the steps of:

directly connecting a hand transportable code reader to the vehicle diagnostic port;

communicating the vehicle diagnostic information from the vehicle diagnostic port to code reader;

communicating the vehicle diagnostic information from the code reader to a wireless local connectivity network interfacing the local connectivity network with a cellular telephone to access a remote service provider to communicate the vehicle diagnostic information wirelessly between the vehicle diagnostic port and the remote service provider via a wireless communication pathway from the hand transportable code reader to the wireless local connectivity network and then to the cellular telephone network; and configuring the cellular telephone to generate a first data ready indicator signal to indicate receipt of diagnostic trouble codes from said local connectivity circuit of said hand portable code reader, and a second indicator signal to indicate the presence of one or more pre-determined trouble codes, or other diagnostic information, representative of a more immediate need for attention.

39. The method as recited in claim 38, further comprising the step of disengaging the code reader from the vehicle diagnostic port, prior to communicating the vehicle diagnostic information from the code reader to the local connectivity network.

40. The method as recited in claim 38, wherein the step of interfacing the local connectivity network with a cellular telephone comprises the steps of interfacing the local connectivity network with a cellular telephone and interfacing the cellular telephone with the cellular telephone network.

41. The method as recited in claim 38 wherein the vehicle diagnostic information comprises diagnostic trouble codes.

* * * * *